(12) United States Patent
Takada et al.

(10) Patent No.: US 9,784,223 B2
(45) Date of Patent: Oct. 10, 2017

(54) CONDENSED WATER TREATMENT DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Noriyuki Takada, Susono (JP); Takeshi Hashizume, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/897,193

(22) PCT Filed: Jun. 28, 2013

(86) PCT No.: PCT/JP2013/067876
§ 371 (c)(1),
(2) Date: Dec. 9, 2015

(87) PCT Pub. No.: WO2014/207916
PCT Pub. Date: Dec. 31, 2014

(65) Prior Publication Data
US 2016/0146163 A1     May 26, 2016

(51) Int. Cl.
*F02M 25/07*     (2006.01)
*F02M 26/35*     (2016.01)
(Continued)

(52) U.S. Cl.
CPC ............. *F02M 26/35* (2016.02); *F01N 9/002* (2013.01); *F02D 41/0055* (2013.01);
(Continued)

(58) Field of Classification Search
CPC ........ F02M 26/35; F02M 26/20; F02M 26/28; F02M 26/29; F01N 3/005; F01N 3/0205;
(Continued)

(56) References Cited

U.S. PATENT DOCUMENTS 6,367,256 B1    4/2002   McKee
7,302,795 B2    12/2007   Vetrovec
(Continued)

FOREIGN PATENT DOCUMENTS

EP     3 009 635 A1     4/2016
JP     10-318049     12/1998
(Continued)

OTHER PUBLICATIONS

Office Action issued on Oct. 4, 2016 in U.S. Appl. No. 14/894,022.
(Continued)

*Primary Examiner* — John Kwon
(74) *Attorney, Agent, or Firm* — Finnegan, Henderson, Farabow, Garrett & Dunner, LLP

(57) ABSTRACT

The condensed water treatment device increases the EGR quantity (S16, S17) so as to be larger than the EGR quantity (Qe) calculated based on the operating state, when within a specific time period (S13) from a moment when execution of filter regeneration control is started to a moment after predetermined time has elapsed following the end of the execution, and also in a case where (S15) the storage water quantity (Qw) of a condensed water tank storing condensed water generated in an EGR cooler is smaller than a normative water quantity (Qwt).

4 Claims, 8 Drawing Sheets

(51) Int. Cl.
   *F02M 26/23*    (2016.01)
   *F02M 26/30*    (2016.01)
   *F02M 25/028*   (2006.01)
   *F02M 25/022*   (2006.01)
   *F02M 26/15*    (2016.01)
   *F02M 25/025*   (2006.01)
   *F01N 9/00*     (2006.01)
   *F02D 41/00*    (2006.01)
   *F01N 3/08*     (2006.01)
   *F01N 3/021*    (2006.01)
   *F02D 41/14*    (2006.01)

(52) U.S. Cl.
   CPC ........ *F02M 25/025* (2013.01); *F02M 25/028* (2013.01); *F02M 25/0222* (2013.01); *F02M 26/15* (2016.02); *F02M 26/23* (2016.02); *F02M 26/30* (2016.02); *F01N 3/021* (2013.01); *F01N 3/0842* (2013.01); *F01N 2240/02* (2013.01); *F01N 2240/22* (2013.01); *F01N 2570/22* (2013.01); *F02D 2041/1472* (2013.01); *Y02T 10/47* (2013.01)

(58) Field of Classification Search
   CPC ........ F01N 3/021; F01N 3/0814; F01N 3/082; F01N 3/0842
   USPC .......... 123/568.12, 568.22; 60/278, 298, 309
   See application file for complete search history.

(56) References Cited

U.S. PATENT DOCUMENTS

| | | | |
|---|---|---|---|
| 7,845,167 B2 | 12/2010 | Miyagawa et al. | |
| 8,250,856 B2 | 8/2012 | Ohashi | |
| 2005/0223700 A1* | 10/2005 | Abe | F01N 3/0231 60/295 |
| 2005/0247052 A1* | 11/2005 | Kobayashi | F01N 13/009 60/297 |
| 2007/0214774 A1* | 9/2007 | Higuchi | F02D 41/025 60/285 |
| 2010/0192550 A1* | 8/2010 | Tsujimoto | F01N 3/106 60/287 |
| 2011/0011084 A1* | 1/2011 | Yanagida | F02M 35/084 60/605.2 |
| 2012/0085146 A1* | 4/2012 | Maeda | G01N 27/043 73/23.31 |
| 2012/0090584 A1 | 4/2012 | Jung | |
| 2013/0298883 A1 | 11/2013 | Archer et al. | |
| 2013/0333638 A1* | 12/2013 | Nishida | F02M 21/0227 123/3 |
| 2016/0115861 A1* | 4/2016 | Ito | F02M 26/35 60/278 |
| 2016/0138451 A1* | 5/2016 | Takada | F01N 3/2066 60/278 |
| 2016/0146163 A1* | 5/2016 | Takada | F02M 26/30 123/568.12 |
| 2016/0153376 A1* | 6/2016 | Katayama | F02D 41/0052 123/445 |
| 2016/0153406 A1* | 6/2016 | Takada | F01N 3/2066 60/278 |

FOREIGN PATENT DOCUMENTS

| | | |
|---|---|---|
| JP | H11-82182 | 3/1999 |
| JP | 2008-280945 | 11/2008 |
| JP | 2009-68477 | 4/2009 |
| JP | 2010-048107 A | 3/2010 |
| JP | 2012-87779 | 5/2012 |
| JP | 2012-127327 A | 7/2012 |
| JP | 2012-163061 A | 8/2012 |
| JP | 2012-189022 A | 10/2012 |
| JP | 2012-215142 A | 11/2012 |
| WO | WO 2009/071439 A1 | 6/2009 |
| WO | WO 2011/149459 A1 | 12/2011 |

OTHER PUBLICATIONS

Notice of Allowance issued in U.S. Appl. No. 14/894,022 dated Mar. 31, 2017.

Supplemental Notice of Allowability issued in U.S. Appl. No. 14/894,022 dated May 23, 2017.

Notice of Allowance and Notice of Allowability issued in U.S. Appl. No. 14/894,022 dated Jun. 20, 2017.

* cited by examiner

CONDENSED WATER TREATMENT DEVICE FOR INTERNAL COMBUSTION ENGINE

CROSS-REFERENCE TO RELATED APPLICATIONS

This application is a national phase application of International Application No. PCT/JP2013/067876, filed Jun. 28, 2013, the content of which is incorporated herein by reference.

TECHNICAL FIELD

The present invention relates to a condensed water treatment device for an internal combustion engine, the condensed water treatment device treating condensed water generated in an EGR device.

BACKGROUND ART

As a condensed water treatment device for an internal combustion engine, known is the one which stores, in a condensed tank, condensed water generated in an EGR cooler, and injects the condensed water to an intake passage when the storage water quantity stored in the condensed water tank reaches a predetermined quantity (Patent Literature 1). The condensed water supplied to the intake passage is led into a cylinder with intake gas to vaporize. Thereby, the combustion temperature is suppressed. As a result of that, the generation quantity of NOx caused by combustion is suppressed. In addition, as another literature of prior art relating to the present invention, there are Patent Literatures 2 to 4.

CITATION LIST

Patent Literature

PTL1: JP-A-H10-318049
PTL2: JP-A-2012-87779
PTL3: JP-A-2008-280945
PTL4: JP-A-2009-68477

SUMMARY OF INVENTION

Technical Problem

In order to use condensed water stored in a condensed water tank for suppressing combustion temperature, it is necessary to secure a storage water quantity of the condensed water tank.

Then, the present invention aims to provide a condensed water treatment device for an internal combustion engine, the condensed water treatment device having ability to secure the storage water quantity of the condensed water tank.

Solution to Problem

A condensed water treatment device for an internal combustion engine as one aspect of the present invention is a condensed water treatment device for an internal combustion engine, the condensed water treatment device being applied to the internal combustion engine comprising: an EGR device which has an EGR passage leading a part of exhaust gas as EGR gas to an intake system and an EGR cooler cooling the EGR gas; a filter which captures PM included in the exhaust gas; an EGR quantity calculating device which is configured to calculate an EGR quantity which is an inflow quantity of the EGR gas to the intake system, based on an operating state; and a filter regeneration controlling device which is configured to execute a filter regeneration control where the PM captured by the filter is removed, wherein the condensed water treatment device comprises: a condensed water tank which stores condensed water generated in the EGR cooler; and an EGR quantity increasing device which is configured to increase the EGR quantity so as to be larger than a normative gas quantity which is the EGR quantity calculated by the EGR quantity calculating device, in a case where a storage water quantity of the condensed water stored in the condensed water tank is smaller than a normative water quantity, when within a specific time period from a moment when execution of the filter regeneration control is started to a moment after a predetermined time has elapsed following the end of the execution.

When the EGR quantity increases, the generation quantity of condensed water generated in the EGR cooler increases. Further, by the increase of the EGR quantity, the generation quantity of PM (Particulate Matter) also increases. The filter regeneration control is a control for removing the PM in a case where the accumulation quantity of the PM captured by the filter reaches the up limit. Therefore, in a specific time period from a moment when the execution of the filter regeneration control is started to a moment after the predetermined time has elapsed following the end of the execution, there is some allowance in the accumulation quantity of PM. The condensed water treatment device of the present invention increases, in a case where the storage water quantity of the condensed water tank is smaller than the normative water quantity, the EGR quantity so as to be larger than the normative gas quantity within the specific time period in which there is some allowance in the accumulation quantity. Thereby, while suppressing that the accumulation quantity of PM captured by the filter becomes excessive, it is possible to increase the storage water quantity of the condensed water tank.

In one embodiment of the condensed water treatment device of the present invention, the EGR quantity increasing device may be configured to increase the EGR quantity so as to be larger than the normative gas quantity, in a case where the storage water quantity of the condensed water stored in the condensed water tank is smaller than the normative water quantity outside the specific time period, and an increase quantity of the EGR quantity increased within the specific time period by the EGR quantity increasing device may be larger than an increase quantity of the EGR quantity increased outside the specific time period by the EGR quantity increasing device. In this embodiment, since the storage water quantity of the condensed water tank increases even outside the specific time period because of the increase of the EGR quantity, it the storage water quantity of the condensed water tank can be increased in a shorter time than that in a case where the EGR quantity is increased only within the specific time period. Further, even though the EGR quantity is increased outside the specific time period, the increase quantity thereof is smaller than the increase quantity of EGR quantity increased within the specific time period. Accordingly, it is possible to suppress that the accumulation quantity of PM becomes excessive.

In that embodiment, the normative water quantity to be used within the specific time period may be set so as to be larger than the normative water quantity to be used outside the specific time period. In this case, in comparison with the case where the normative water quantity used within the specific time period is the same as the normative water quantity used outside the specific time period, the execution frequency of operation of increasing the EGR quantity within the specific time period increases comparatively. Thereby, it is possible to increase the storage water quantity of the condensed water tank in a further shorter time. Due to this, it is easier to secure the storage water quantity.

In one embodiment of the condensed water treatment device of the present invention, the increase quantity of the EGR quantity increased by the EGR quantity increasing device may be calculated based on an accumulation quantity of the PM captured by the filter. According to this embodiment, it is possible to increase the EGR quantity in accordance with the allowance in the accumulation quantity of PM. Thereby, it is possible to increase the EGR quantity in a range that it is possible to suppress that the accumulation quantity of PM becomes excessive. Accordingly, it is possible to increase the storage water quantity of the condensed water tank in a further shorter time.

BRIEF DESCRIPTION OF DRAWINGS

FIG. 1 is a diagram showing a whole configuration of an internal combustion engine which a condensed water treatment device according to one embodiment of the present invention is applied to.

DESCRIPTION OF EMBODIMENTS (A First Embodiment)

Figure 1:
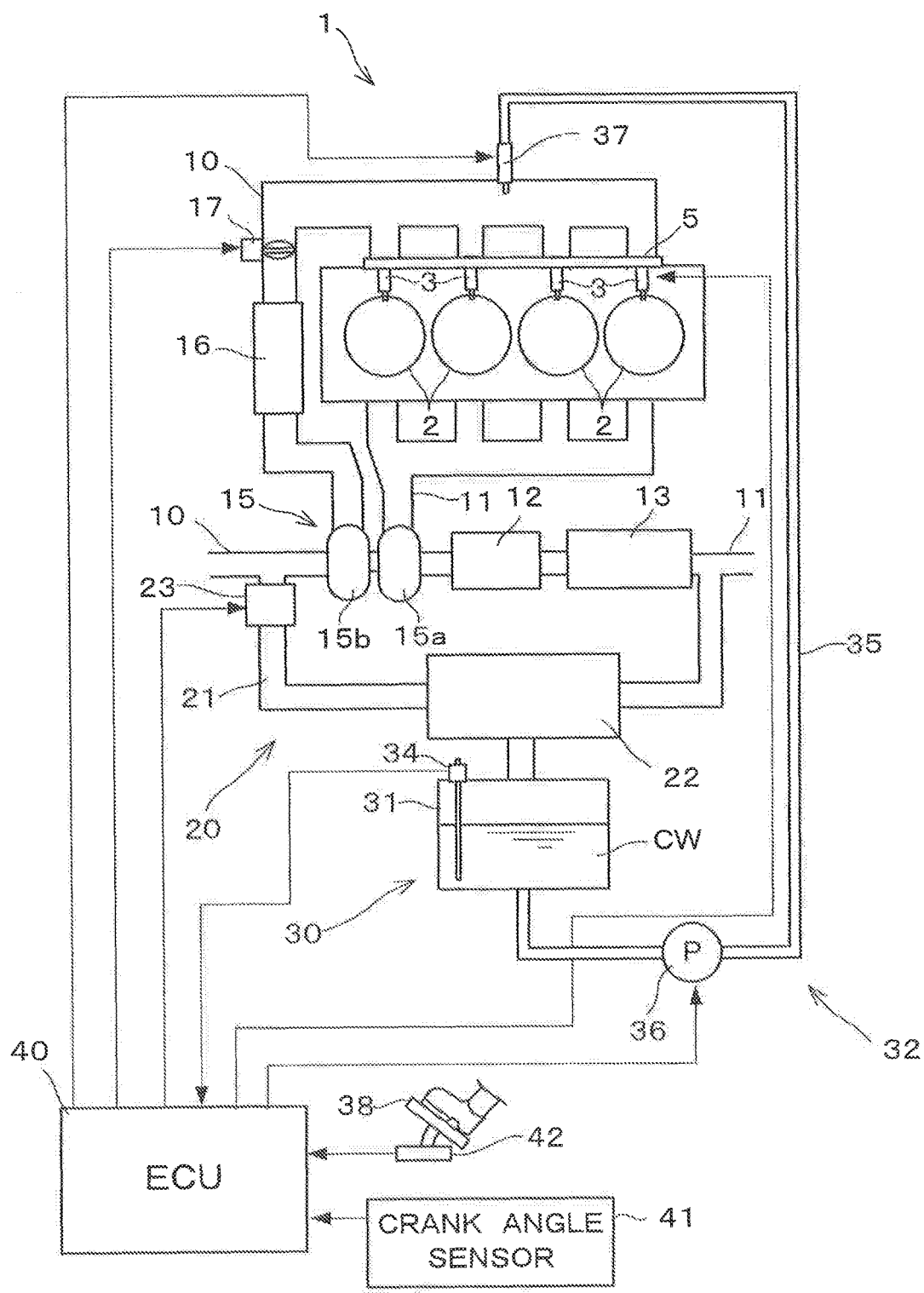

As shown in FIG. 1, an internal combustion engine 1 is configured as a four-cylinder type in line diesel engine in which four cylinders 2 are arranged along a straight line. The internal combustion engine 1 is mounted as a drive source for traveling of, for example, a car. The internal combustion engine 1 is provided, for each cylinder 2, with a fuel injection valve 3 for supplying fuel into each cylinder 2. Each fuel injection valve 3 is connected with a common rail 5 where fuel is forcibly fed, and fuel is supplied to each fuel injection valve 3 via the common rail 5. An intake passage 10 and an exhaust passage 11 are connected with each cylinder 2. Air led into the intake passage 10 is filled in each cylinder 2 at a suction stroke. Fuel injected from the fuel injection valve 3 to the cylinder 2 is self-ignited and combusted at a compression stroke. Exhaust gas after the combustion is led into the exhaust passage 11. The exhaust gas led to the exhaust passage 11 is drained to the atmospheric air after the PM is captured by a DPF (Diesel Particulate Filter) 12 and NOx is reduced by a NOx storage-reduction type of exhaust purifying device 13. At the upstream side of the DPF 12, a turbine 15a of a turbo charger 15 is provided. The intake passage 10 is provided with a compressor 15b of the turbo charger 15, an intercooler 16 cooling air pressured by the compressor 15b, and a throttle valve 17 adjusting the flow rate of intake gas.

The internal combustion engine 1 is provided with an EGR device 20 which executes the EGR (Exhaust Gas Recirculation) that a part of exhaust gas is recirculated to an intake system for reduction of NOx and improvement of fuel economy. The EGR device 20 comprises: an EGR passage 21 connecting the exhaust passage 11 and the intake passage 10; an EGR cooler 22 cooling the exhaust gas in the EGR passage 21; and an EGR valve 23 for adjusting the flow rate of exhaust gas to be led to the intake passage 10 (the EGR gas). The EGR passage 21 has an exhaust side end portion opening at the downstream side of the exhaust purifying device 13 and an intake side end portion opening at the upstream side of the compressor 15b. As well known, the EGR cooler 22 uses cooling water in the internal combustion engine 1 as a refrigerant, and decreases the temperature of the EGR gas by heat exchange between the refrigerant and warm exhaust gas. The temperature of the EGR gas decreases whereby moisture included in the EGR gas is condensed. Due to this, condensed water is generated in the EGR cooler 22. In addition, the temperature of the EGR gas in the EGR passage 21 decreases whereby condensed water is also generated in the EGR passage 21.

The internal combustion engine 1 is provided with a condensed water treatment device 30 for collecting condensed water generated in the EGR cooler 22. The condensed water treatment device 30 comprises: a condensed water tank 31 which stores condensed water CW; and a condensed water supplying mechanism 32 which supplies to the intake system of the internal combustion engine 1, the condensed water CW stored in the condensed water tank 31. The condensed water tank 31 is provided with a water level sensor 34 which outputs a signal according to the storage water quantity (a water level) of the condensed water CW stored in the condensed water tank 31. The condensed water supplying mechanism 32 has a condensed water passage 35 connecting the condensed water tank 31 and the intake passage 10. The condensed water passage 35 is provided with an electric pump 36 and an injection valve 37 which injects and supplies to the inside of the intake passage 10, the condensed water pressured by the pump 36. It is possible to control the supply quantity of condensed water by controlling a valve opening period of the injection valve 37.

The internal combustion engine 1 is provided with an engine control unit (ECU) 40 configured as a computer which controls each portion of the internal combustion engine 1. The ECU 40 executes a main motion control for controlling the fuel injection quantity and the injection timing of the internal combustion engine 1 by operating the fuel injection valve 3. The ECU 40 is also used to control of the EGR device 20 and the condensed water treatment device 30. Further, the ECU 40 executes a filter regeneration control for removing the PM in a case where the accumulation quantity of PM captured by the DPF 12 reaches an upper limit. The details will be described later, but in the filter regeneration control, fuel injection is executed in the exhaust stroke whereby the exhaust temperature is made to increase so that the PM captured by the DPF 12 is combusted and removed.

Signals from a lot of sensors are inputted to the ECU 40, the sensors detecting various kinds of physical amounts for grasping the operation state of the internal combustion engine 1. For example, as sensors relating to the present invention, provided to the internal combustion engine 1 are a crank angle sensor 41 which outputs a signal according to a crank angle of the internal combustion engine 1, an accelerator opening degree sensor 42 which outputs a signal according to a depression amount of an accelerator pedal 50 provided to the internal combustion engine 1 (the accelerator opening degree), and the like. The signals outputted by those sensors are inputted to the ECU 40. Further, the signal outputted by the water level sensor 34 is also inputted to the ECU 40.

Figure 2:
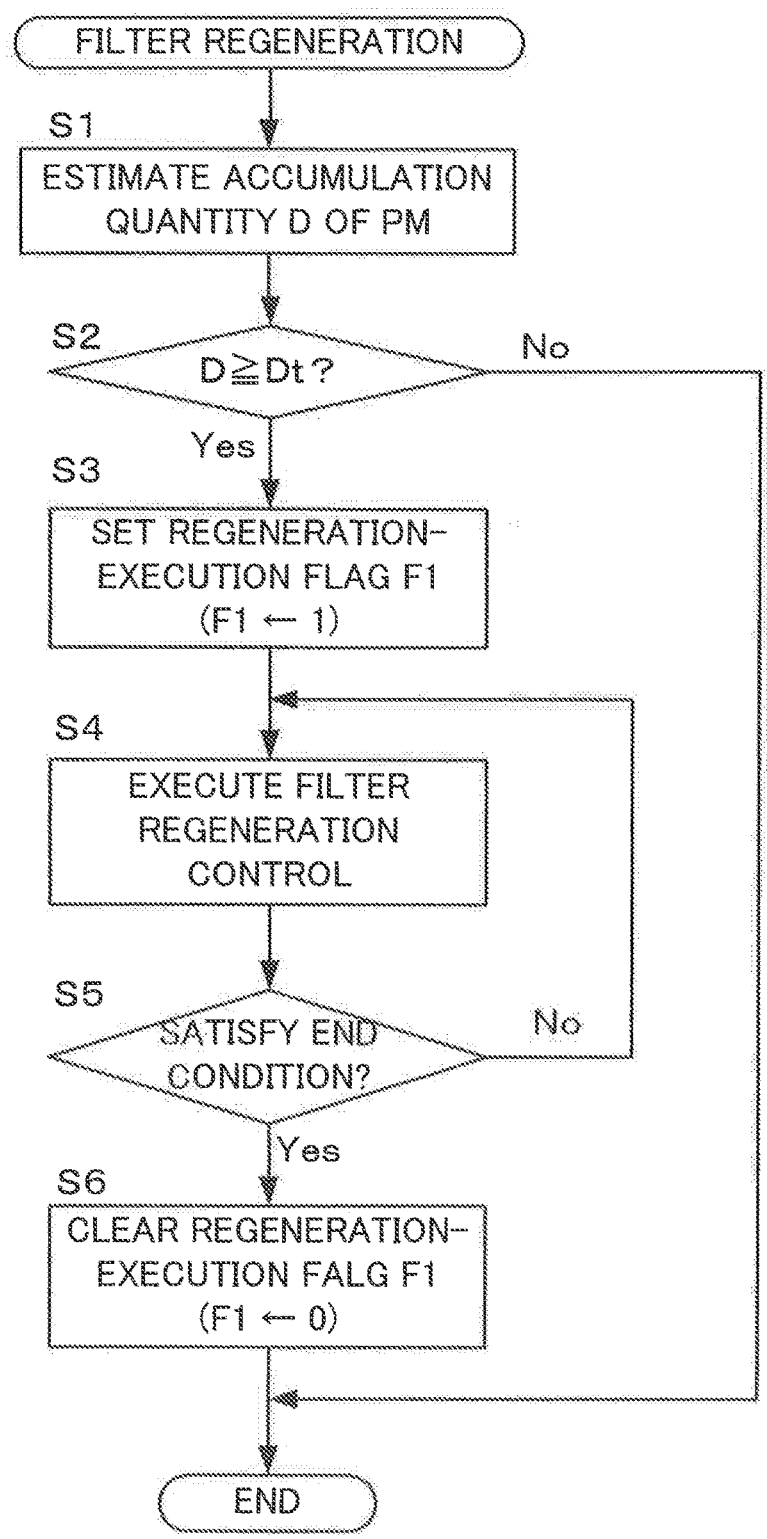
FIG. 2 is a flow chart showing one example of a control routine of filter regeneration.

The ECU 40 executes the filter regeneration control according to the control routine shown in FIG. 2. A computer program for the control routine shown in FIG. 2 is stored in the ECU 40, and read out as appropriate to be executed repeatedly in predetermined intervals. In step S1, the ECU 40 estimates the accumulation quantity D of the PM captured by the DPF 12. The ECU 40 detects a pressure difference between the upstream side of the DPF 12 and the downstream side of the DPF 12 with using a pressure sensor not illustrated, and estimates the accumulation quantity D based on the pressure difference. In step S2, the ECU 40 determines whether the accumulation quantity D of PM is equal to or larger than the upper limit Dt. This upper limit Dt is a criterion value of the accumulation quantity D for the ECU 40 to determine whether the filter regeneration control should be executed or not.

Accordingly, in a case where the accumulation quantity D is equal to or larger than the upper limit Dt, the filter regeneration control is necessary to be executed. In a case where the accumulation quantity D is equal to or larger than the upper limit Dt, the ECU 40 goes to step S3. In a case where the accumulation quantity D is less than the upper limit Dt, the ECU 40 skips the following processes, and ends the routine of this time.

In step S3, the ECU 40 sets a regeneration-execution flag F1 for managing execution of the filter regeneration control. By confirming whether the regeneration-execution flag F1 has been set or not, it is possible to determine whether the filter regeneration control is ongoing or not. In step S4, the ECU 40 executes the fuel injection in the exhaust stroke to increase the exhaust temperature. Thereby, the PM captured by the DPF 12 is combusted and removed. In step S5, the ECU 40 determined whether an end condition for determining end of the filter regeneration control is satisfied or not. Until the end condition is satisfied, the filter regeneration control of step S4 is continuously executed. As the end condition, it is set that the accumulation quantity D of PM becomes, by the execution of the filter regeneration control, equal to or smaller than an end determination value. Alternatively, it can be set as the end condition that a predetermined time has elapsed from a moment when the execution of the filter regeneration control is started. In a case where the end condition is satisfied, the ECU 40 goes to step S6 to clear the regeneration-execution flag F1, and ends the routine of this time. The ECU 40 functions as a filter regeneration controlling device according to the present invention by executing the control routine shown in FIG. 2.

Figure 3:
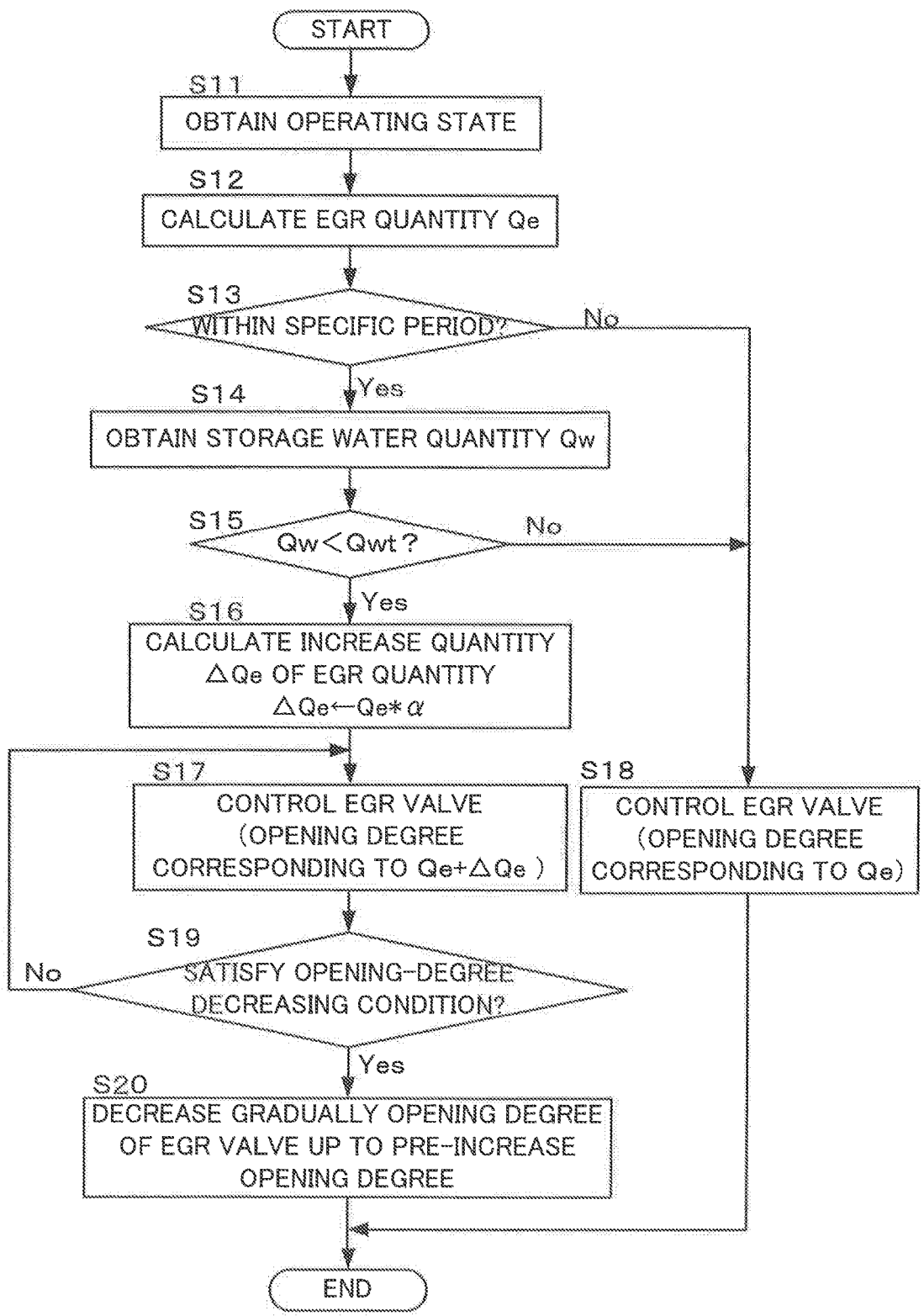
FIG. 3 is a flow chart showing one example of a control routine according to a first embodiment.

The ECU 40 executes a control routine shown in FIG. 3 in parallel to the control routine shown in FIG. 2, to collect the condensed water. A computer program of the control routine shown in FIG. 3 is stored in the ECU 40, and read out as appropriate to be executed repeatedly in predetermined intervals. In step S11, the ECU 40 obtains the operating state of the internal combustion engine 1. The ECU 40 obtains the engine rotational speed and the load with respect to the internal combustion engine 1, as the operating state. In step S12, the ECU 40 calculates the EGR quantity Qe based on the engine rotational speed and the load of the internal combustion engine 1. The EGR quantity Qe is calculated based on a map (not illustrated) which is set in view of the quantity of NOx which could be generated in the internal combustion engine 1 and has variables which are the engine rotational speed and the load. The EGR quantity Qe calculated in this way, corresponds to a normative gas quantity of the present invention. The EGR quantity Qe calculated in step S12 is determined on the condition that condensed water is not supplied to the intake system. Therefore, in a case where condensed water is supplied to the intake system, the EGR quantity Qe is corrected according to the supply quantity of condensed water.

In step S13, the ECU 40 determines whether the present time is within a specific time period or not. The specific time period is a time period from a moment when the execution of the filter regeneration control is started to a moment after predetermined time has elapsed following the end of the execution. The predetermined time is set as appropriate. For example, 30 seconds is set as the predetermined time. The ECU 40 confirms the regeneration-execution flag F1, and in a case where the flag F1 is set, the ECU 40 determines that the present time is within the specific time period. In addition, in a case where the flag F1 is cleared, the ECU 40 measures time elapsed from a moment when the flag F1 is cleared, and in a case where the elapsed time is within the predetermined time, the ECU 40 determines that the present time is within the specific time period. The filter regeneration control is started whereby the accumulation quantity of PM decreases. And, as shown in FIG. 2, when the accumulation quantity D of PM decreases up to the end determination value, the end condition is satisfied whereby the filter regeneration control is ended. That is, it should be understood that the specific time period indicates such a time period that the accumulation quantity D of PM is below the upper limit Dt and there is some allowance up to the upper limit Dt in the accumulation quantity D. When the present time is within the specific time period, it is possible to permit the increase of generation quantity of PM. If the present time is within the specific time period, the ECU 40 goes to step S14, and otherwise, goes to step S18.

In step S14, the ECU 40 obtains the storage water quantity Qw of the condensed water tank 31 by referring to a signal outputted by the water level sensor 34. Instead of use of the water level sensor 34, the following way is possible. The generation quantity of condensed water is estimated based on the operating state of the internal combustion engine 1 and temperature information such as the outside air temperature and the cooling water temperature, and based on the estimation result, the storage water quantity Qw of the condensed water tank 31 by estimation is obtained. In step S15, the ECU 40 determines whether the storage water quantity Qw is smaller than a normative water quantity Qwt or not. The normative water quantity Qwt is a predetermined fixed number set as a lower limit of the storage water quantity Qw, at which it should be determined that the condensed water is lacking in view of a use quantity of the condensed water. In a case where the storage water quantity Qw is smaller than the normative water quantity Qwt, the ECU 40 goes to step S16. The storage water quantity Qw is equal to or larger than the normative water quantity Qw, the ECLU 40 goes to step S18.

In step S16, the ECU 40 calculates an increase quantity ΔQe of the EGR quantity. The increase quantity ΔQe is calculated by multiplying the EGR quantity Qe calculated in step S12 by a predetermined increase rate α. In step S17, the ECU 40 controls the EGR valve 23 so that the opening degree thereof is set to an opening degree corresponding to the increased EGR quantity Qe+ΔQe. Thereby, it is possible to increase an inflow quantity of the EGR gas to the intake system. As a result of that, the generation quantity of condensed water in the EGR cooler 22 increases, and the storage water quantity Qw of the condensed water tank 31 increases. The opening degree of the EGR valve 23 increased in step S17 is maintained until it is determined that an opening-degree decreasing condition is satisfied in step S19. As the opening-degree decreasing condition, it is set that the storage water quantity Qw returns to a threshold value qt which is set to a value larger than the normative water quantity Qwt. Alternatively, it could be set as the opening-degree decreasing condition that at least predetermined time has elapsed after the opening degree of the EGR valve 23 is increased. In a case where the opening-degree decreasing condition is satisfied, the ECU 40 goes to step S20. In step S20, the ECU 40 gradually decreases the opening degree of the EGR valve 23 up to a pre-increase opening degree, that is, the opening degree corresponding to the EGR quantity Qe. Thereby, it is possible to avoid a rapid decrease of the inflow quantity of EGR gas. Accordingly, it is possible to suppress the increase of the generation quantity of smoke and the like caused by the rapid decrease.

On the other hand, in a case where the present time is outside the specific time period or the storage water quantity Qw is equal to or larger than the normative water quantity Qwt, the increase of EGR quantity is not executed. Therefore, in step S18, the ECU 40 controls the EGR valve 23 so that the opening degree thereof is set to an opening degree corresponding to the EGR quantity Qe calculated in step S12.

The ECU 40 functions as an EGR quantity calculating device of the present invention by executing the step S12 of FIG. 3, and functions as an EGR quantity increasing device of the present invention by executing steps S16 and S17 of FIG. 3.

Figure 4:
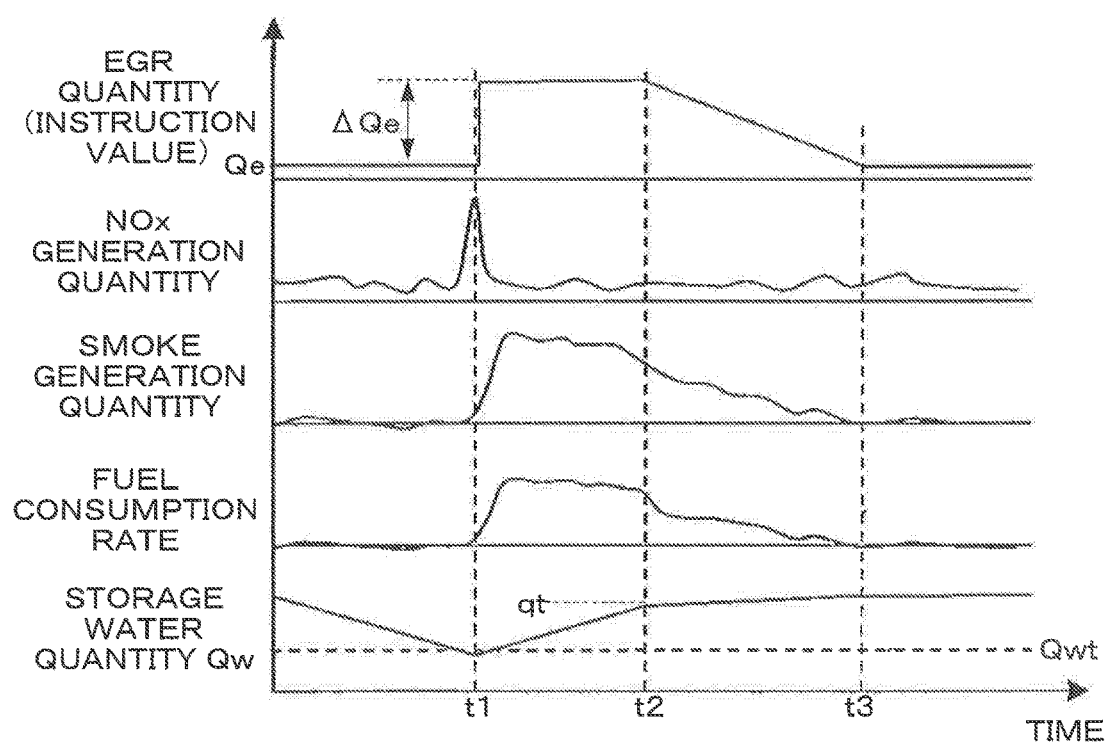
FIG. 4 is a time chart showing one example of a control result in the first embodiment.

One example of control results obtained by the execution of the control routine of FIG. 3 by the ECU 40 will be described in reference to FIG. 4. The EGR quantity shown in FIG. 4 and other figures corresponds to an instruction value of the opening degree given by the ECU 40 to the EGR valve 23, and does not indicate the EGR quantity of EGR gas actually led into the intake system. As shown in FIG. 4, when the storage water quantity Qw of the condensed water tank 31 is smaller than the normative water quantity Qwt at time t1, the EGR quantity is increased by Δ Qe from the EGR quantity Qe. Since the EGR quantity becomes, by this increase, larger than a value calculated in view of the operating state of the internal combustion engine 1 and the generation quantity of NOx, the generation quantity of NOx, the generation quantity of smoke, and the fuel consumption rate increase at the time t1. After that, since the combustion temperature decreases because of the increase of the EGR quantity, the generation quantity of NOx which has increased temporally, turns to decrease and almost reverts to a state corresponding to the pre-increase EGR quantity. The EGR quantity is increased at the time t1 and such a state is maintained whereby the generation quantity of condensed water increases. Due to this, the storage water quantity Qw of the condensed water tank 31 increases.

When the storage water quantity Qw recovers up to a threshold value qt at time t2, the opening degree of the EGR valve 23 is decreased gradually whereby the EGR quantity gradually decreases. Thereby, the generation quantity of smoke and the fuel consumption rate decrease gradually. Due to this, it is possible to suppress deteriorations caused by a rapid decrease of the EGR quantity, with respect to the generation quantity of smoke and the fuel consumption rate. When the opening degree of the EGR valve 23 reverts to the opening degree corresponding to the pre-increase EGR quantity at time t3, each of the generation quantity of smoke and the fuel consumption rate reverts to the state corresponding to the pre-increase EGR quantity. At this moment, the storage water quantity Qw is almost constant. That is, the collection quantity of condensed water which is collected to the condensed water tank 31 and the use quantity of condensed water taken out from the condensed water tank 31 are in equilibrium.

According to the first embodiment, in a state that the storage water quantity Qw of the condensed water tank 31 is smaller than the normative water quantity Qwt, and also when within the specific time period in which there is some allowance in the accumulation quantity of PM, the EGR quantity is increased so as to be larger than the EGR quantity (the normative gas quantity) calculated based on the operating state of the internal combustion engine 1. Thereby, while it is suppressed that the accumulation quantity of PM captured by the DPF 12 becomes excessive, it is possible to increase the storage water quantity of the condensed water tank 31.

(A Second Embodiment)

Next, the second embodiment of the present invention will be described in reference to FIGS. 5 and 6. The second embodiment is the same as the first embodiment except the contents shown in FIGS. 5 and 6. With respect to a physical construction of the second embodiment, FIG. 1 should be referenced. With respect to the filter regeneration control of the second embodiment, FIG. 2 should be referenced. The second embodiment is characterized in that the increase of EGR quantity for increasing a storage water quantity of the condensed water tank 31 is executed regardless of whether the time is within or outside the specific time period, and the increase quantity of EGR quantity is changed depending on whether the time is within or outside the specific time period.

Figure 5:
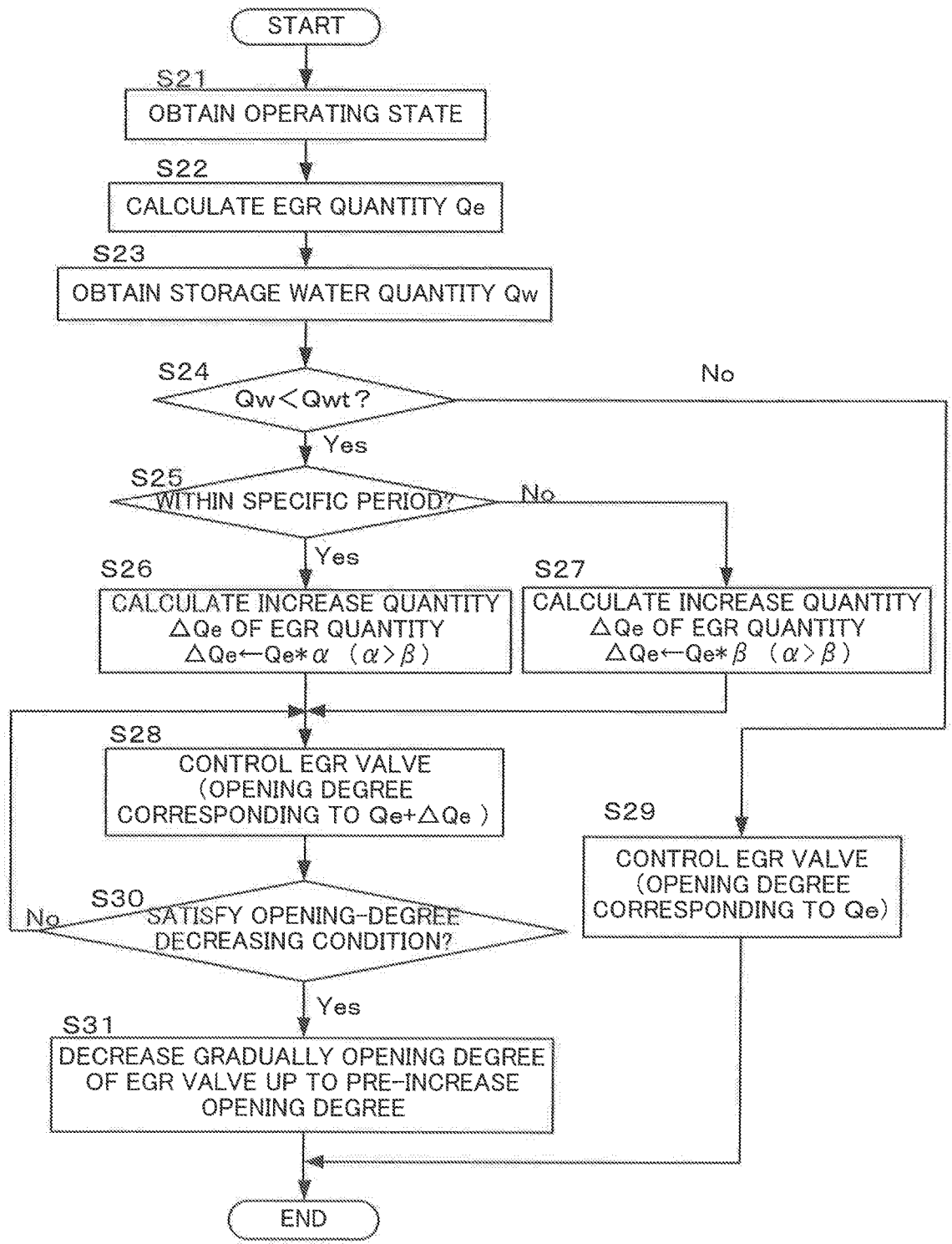
FIG. 5 is a flow chart showing one example of a control routine according to a second embodiment.
Figure 6:
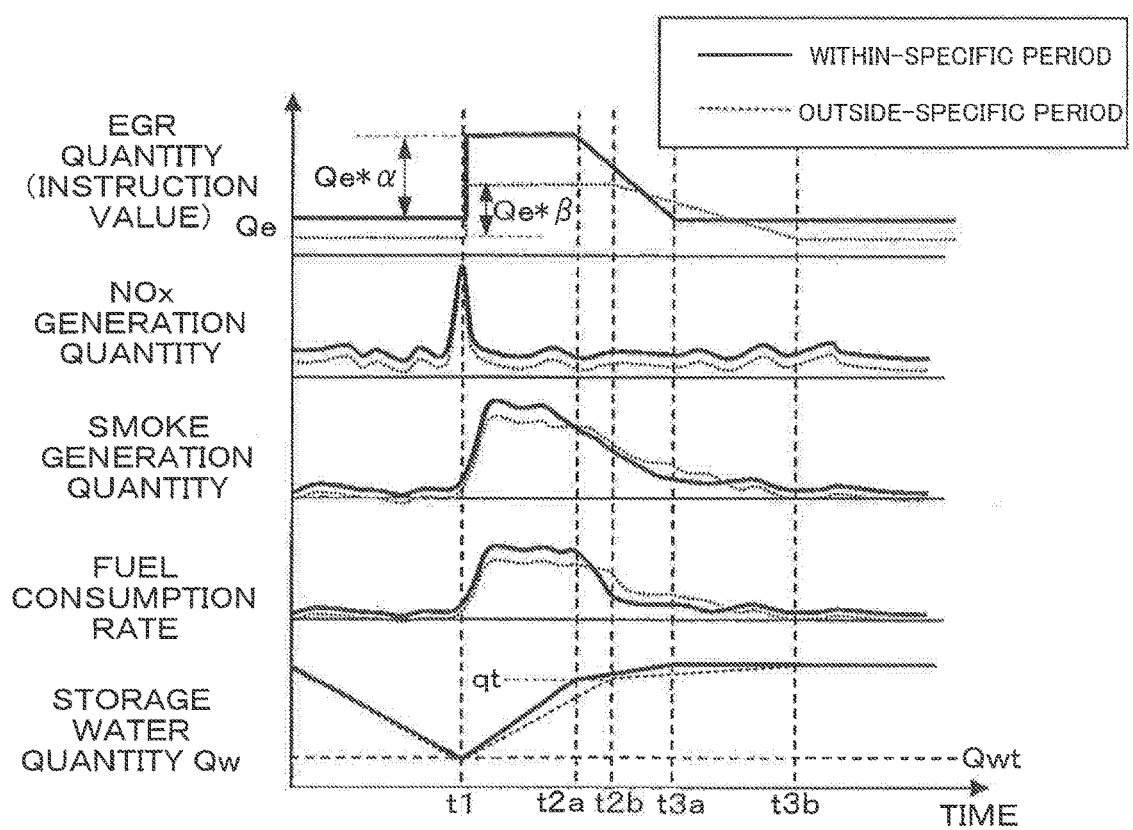
FIG. 6 is a time chart showing one example of a control result in the second embodiment.

A computer program for a control routine shown in FIG. 5 is stored in the ECU 40, and read out as appropriate to be executed repeatedly in predetermined intervals. In step S21, the ECU 40 obtains the operating state of the internal combustion engine 1, and in step S22 the ECU 40 calculates the EGR quantity Qe. Steps S21 and S22 are the same as steps S11 and S12 shown in FIG. 3 of the first embodiment. In step S23, the ECU 40 refers to a signal outputted by the water level sensor 34 to obtain the storage water quantity Qw of the condensed water tank 31. In step S24, the ECU 40 determines whether the storage water quantity Qw is smaller than the normative water quantity Qwt or not. The normative water quantity Qwt in the present embodiment is also the predetermined fixed number like the normative water quantity Qwt in the first embodiment. In a case where the storage water quantity Qw is smaller than the normative water quantity Qwt, the ECU 40 goes to step S25. In a case where the storage water quantity Qw is equal to or larger than the normative water quantity Qwt, the increase of EGR quantity is not executed. Therefore, the ECU 40 goes to step S29 to control the EGR valve 23 so that the opening degree thereof is set to an opening degree corresponding to the EGR quantity Qe calculated in step S22.

In step S25, the ECU 40 determines whether the present time is within the specific time period or not. The concept of the specific time period and the method for determining whether the present time is within the specific time period or not are the same as them mentioned above. In a case where the present time is within the specific time period, the ECU 40 goes to step S26, and otherwise, goes to step S27. In step S26, the ECU 40 calculates the increase quantity ΔQe of EGR quantity which should be used for the control within the specific time period. The calculation of this increase quantity ΔQe is executed in the same way as the calculation in step S16 shown in FIG. 3 of the first embodiment. That is, the increase quantity Δ Qe is calculated by multiplying the EGR quantity Qe calculated in step S22 by the predetermined increase rate α. On the other hand, in step S27, the ECU 40 calculates the increase quantity ΔQe of EGR quantity which should be used for the control outside the specific time period. This increase quantity ΔQe is calculated by multiplying the EGR quantity Qe calculated in step S22 by an increase rate β smaller than the mentioned increase rate α. Thereby, in a case where the EGR quantity Qe, that is the normative gas quantity, is the same, the increase quantity ΔQe to be used within the specific time period for the control than the increase quantity ΔQe to be used outside the specific time period for the control.

In step S28, the ECU 40 controls the EGR valve 23 so that the opening degree thereof is set to an opening degree corresponding to the increased EGR quantity Qe+ΔQe. The opening degree of the EGR valve 23 increased in step S28 is maintained until it is determined that the opening-degree decreasing condition is satisfied in step S30. The concept of the opening-degree decreasing condition is the same as the concept mentioned above.

The ECU 40 functions as the EGR quantity calculating device of the present invention by executing step S22 of FIG. 5, and functions as the EGR quantity increasing device of the present invention by executing steps S25 to S28 of FIG. 5.

One example of control results of the control routine shown in FIG. 5 executed by the ECU 40 will be described in reference to FIG. 6. When the storage water quantity Qw of the condensed water tank 31 becomes smaller than the normative water quantity Qwt at time t1, the EGR quantity is increased from the EGR quantity Qe. When within the specific time period, the increase quantity is set to Qe*α. When outside the specific time period, the increase quantity is set to Qe*β. In the example shown in FIG. 6, the increase quantity to be used within the specific time period is larger than the increase quantity to be used outside the specific time period. Similarly to the first embodiment shown in FIG. 4, by the increase of the EGR quantity, the EGR quantity is made larger than a value calculated in view of the operating state of the internal combustion engine 1, the generation quantity of NOx and like. Accordingly, in both cases when it's within the specific time period and when it's outside the specific time period, the generation quantity of NOx, the generation quantity of smoke, and the fuel consumption rate increase at the time t1. After that, since the combustion temperature decreases because of the increase of the EGR quantity, the generation quantity of NOx which has increased temporally, turns to decrease and almost reverts to the state corresponding to the pre-increase EGR quantity. By increasing the EGR quantity at the time t1 and maintaining such a state, the generation quantity of condensed water increases. Due to this, the storage water quantity Qw of the condensed water tank 31 increases.

There is a difference in the increased EGR quantity between the case where it's within the specific time period and the case where it's outside the specific time period. Due to this, with respect to time taken for making the storage water quantity Qw reach the threshold value qt, the case within the specific time period is shorter than the case outside the specific time period. Accordingly, in the case where it's within the specific time period, the opening degree of the EGR valve 23 gradually decreases from time t2a. In the case where it's outside the specific time period, the opening degree of the EGR valve 23 gradually decreases from time t2b later than the time t2a. Thereby, in both of the cases, since the EGR quantity decreases gradually, it is possible to suppress deteriorations caused by the change of the EGR quantity, with respect to the generation quantity of smoke and the fuel consumption rate.

In the case where it's within the specific time period, at time t3a the opening degree of the EGR valve 23 reverts to the opening degree of pre-increase the EGR quantity. In the case where it's outside the specific time period, at time tab the opening degree of the EGR valve 23 reverts to the opening degree corresponding to the pre-increase EGR quantity. Thereby, both of the generation quantity of smoke and the fuel consumption rate also revert to the states corresponding to the pre-increase EGR quantity respectively. And, the collection quantity of condensed water and the use quantity of condensed water becomes in equilibrium.

According to the second embodiment, similarly to the first embodiment, while suppressing that the accumulation quantity of PM captured by the DPF 12 is excessive, it is possible to increase a storage water quantity of the condensed water tank 31. Further, since the storage water quantity Qw of the condensed water tank 31 increases even outside the specific time period because of the increase of EGR quantity, it is possible to increase the storage water quantity Qw of the condensed water tank 31 in a shorter time in comparison with the first embodiment. Although the EGR quantity is increased outside the specific time period, the increase quantity is smaller than that used within the specific time period. Accordingly, it is possible to suppress the accumulation of PM becomes excessive.

(A Third Embodiment)

Next, the third embodiment will be described in reference to FIGS. 7 and 8. The third embodiment corresponds to an embodiment obtained by changing a part of the second embodiment. The third embodiment is characterized in that the normative water quantity to be used within the specific time period is set so as to be larger than the normative water quantity to be used outside the specific time period. The ECU 40 executes a control routine shown in FIG. 7.

Figure 7:
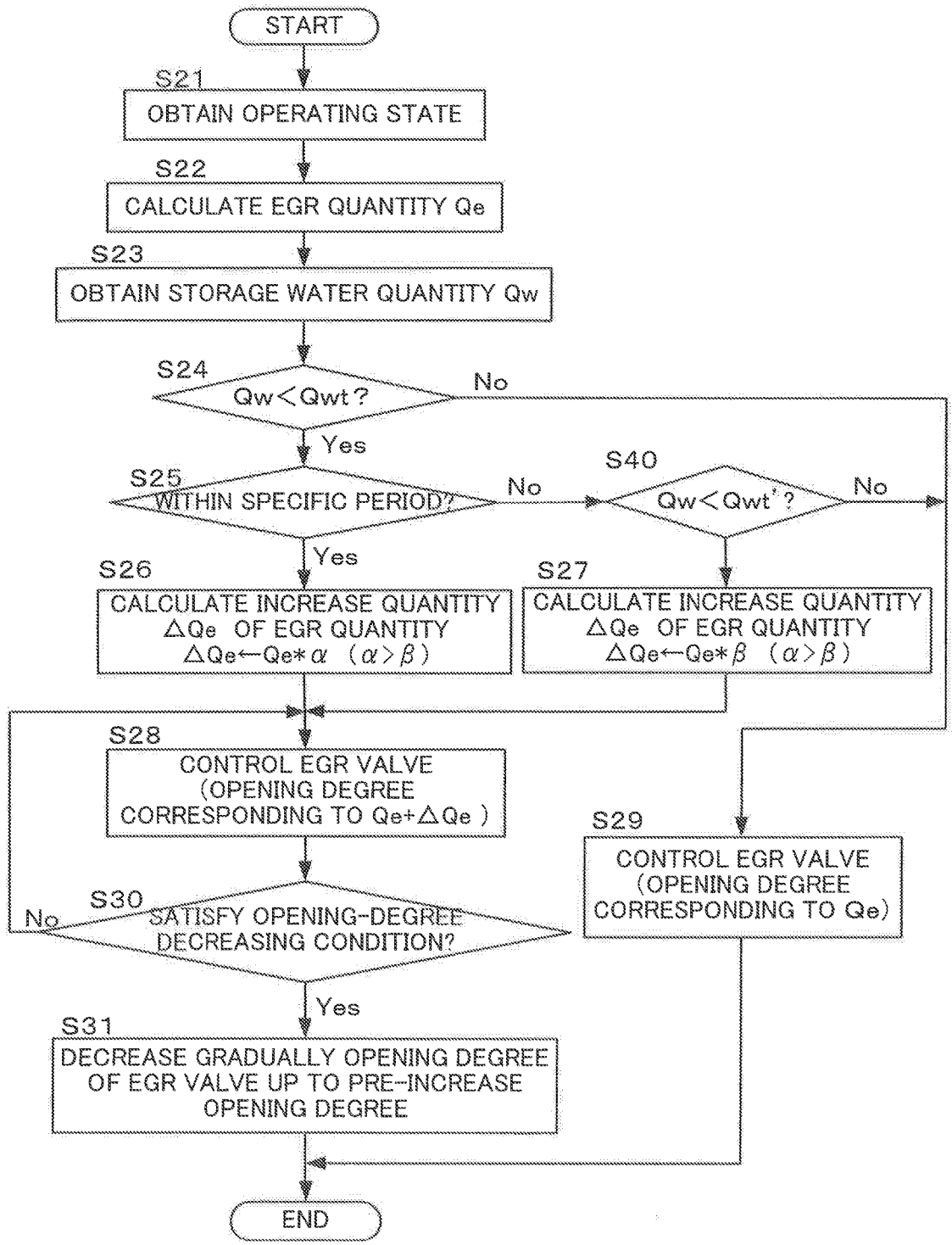
FIG. 7 is a flow chart showing one example of a control routine according to a third embodiment.

The control routine shown in FIG. 7 corresponds to a control routine obtained by adding step S40 between step S25 and step S27 of the control routine shown in FIG. 5. Since the processes except step S40 are the same as those in the third embodiment, the explanations of shared processes will be omitted. In step S40, it is determined whether or not the storage water quantity Qw is smaller than the normative water quantity Qwt' smaller than the normative water quantity Qwt. In other words, the ECU 40 uses the comparatively larger normative water quantity Qwt within the specific time period and uses comparatively smaller normative water quantity Qwt' outside the specific time period, as a determination value of the storage water quantity Qw for determining whether or not it is permitted to execute a control of increasing the EGR quantity to collect condensed water.

Figure 8:
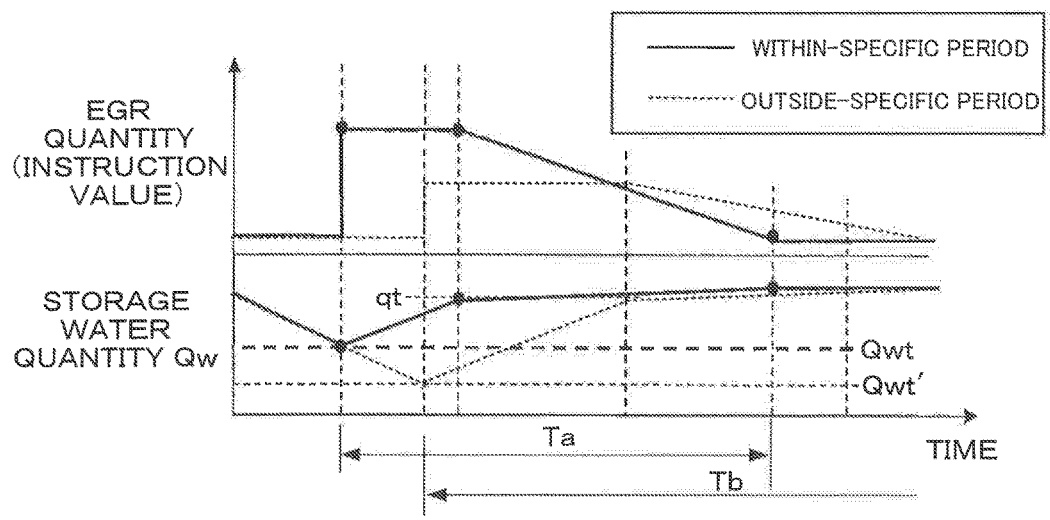
FIG. 8 is a time chart showing an effect of the third embodiment.

Thereby, as shown in FIG. 8, in comparison with the second embodiment, the execution frequency of control for making the EGR quantity increase within the specific time period comparatively increases. That is, in the case where it's within the specific time period, the increase of EGR quantity is started earlier in comparison with the case where it's outside the specific time period, and also a time period Ta for collecting condensed water becomes shorter than a time period Tb. Therefore, it is possible to increase the storage water quantity Qw of the condensed water tank 31 in a further shorter time. Accordingly, it is easier to secure the storage water quantity Qw.

(A Fourth Embodiment)

Figure 9:
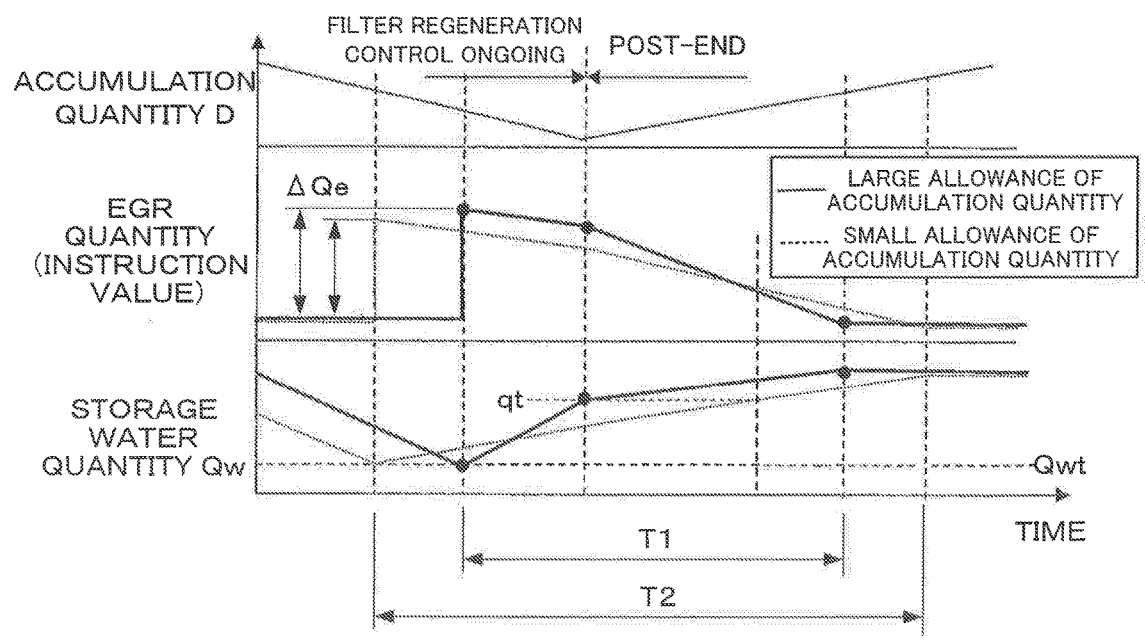
FIG. 9 is a time chart explaining a control content of a fourth embodiment.

Next, the fourth embodiment of the present invention will be described in reference to FIG. 9. The fourth embodiment can be applied to any one of the first to third embodiments. In the fourth embodiment, the increase quantity of the EGR quantity is calculated based on the accumulation quantity of PM. Concretely, the increase quantity of the EGR quantity is made larger as the accumulation quantity of PM is smaller. As shown in FIG. 9, in a case where the accumulation quantity D is such a small that there is a large allowance up to the upper limit, the increase quantity ΔQe of EGR quantity is set so as to be larger than that in a case where the accumulation quantity D is such a large that there is a small allowance up to the upper limit. Further, after the increase of the EGR quantity until the storage water quantity Qw reaches the threshold value qt, the EGR quantity is not stabilized, but is changed according to the accumulation quantity D. And then, after the storage water quantity Qw reaches the threshold value qt, the decreasing rate for making the opening degree of the EGR valve 23 decrease is also set depending on the accumulation quantity D. This decreasing rate is set so as to become larger as the accumulation quantity D is smaller.

Thereby, a collection time period T1 for collecting condensed water in a case where the accumulation quantity D is small is shorter than a collection time period T2 for collecting condensed water in a case where the accumulation quantity D is large. In this way, it is possible to increase the EGR quantity in a range that it is possible to suppress that the accumulation quantity D becomes excessive in a case the storage water quantity Qw is smaller than the normative water quantity Qwt. Therefore, it is possible to increase the storage water quantity Qw of the condensed water tank 31 in a further shorter time.

The present invention is not limited to each above embodiment, and can be executed in various embodiments within a range of the subject matter of the present invention. In each above embodiment, the condensed water is supplied to the intake passage 10 of the internal combustion engine 1. However, a portion where the condensed water is supplied is not limited to the intake system in the internal combustion engine. For example, the following embodiment is also possible. The condensed water is supplied to the exhaust system, and by using a method similar to the internal EGR, the condensed water is led to a cylinder within a valve overlap period. For example, it is possible to execute the present invention in such an embodiment that condensed water is supplied to various kinds of devices, such as an inter cooler which cools air pressured by a turbo charger and an accumulator which is used for heating lubricant oil or intake gas in the internal combustion engine. Further, the condensed water may be supplied to various kinds of devices such as a drive device to which torque outputted by an internal combustion engine is transmitted and an air-conditioning device using heat generated in an internal combustion engine.

In each of the above embodiments, the internal combustion engine 1 is configured as a diesel engine. However, an engine which the present invention can be applied to is not limited to a diesel engine. Accordingly, the present invention can be applied to a spark ignition type combustion engine. In addition, with respect to an engine to which the present invention can be applied, it does not matter whether a turbo charger is provided or not. Accordingly, the present invention can be applied to a natural-intake-type internal combustion engine. In a case where the present invention is applied to the natural-intake-type internal combustion engine, since condensed water can be supplied to an intake system by using negative pressure in an intake passage, it is possible to omit a pump for pressuring the condensed water, the pump being provided in each above embodiment.

The invention claimed is:

1. A condensed water treatment device for an internal combustion engine, the condensed water treatment device being applied to the internal combustion engine and comprising:
    an EGR device which has an EGR passage leading a part of exhaust gas as EGR gas to an intake system and an EGR cooler cooling the EGR gas;
    a filter which captures PM included in the exhaust gas;
    a computer which functions, by executing a computer program, as:
        an EGR quantity calculating device which is configured to calculate an EGR quantity which is an inflow quantity of the EGR gas to the intake system, based on an operating state,
        an EGR quantity increasing device, and
        a filter regeneration controlling device which is configured to execute a filter regeneration control where the PM captured by the filter is removed, wherein
    the condensed water treatment device comprises a condensed water tank which stores condensed water generated in the EGR cooler, and
    the EGR quantity increasing device is configured to:
        determine whether a present time is within a specific time period from a moment when execution of filter regeneration control is started to a moment after a predetermined amount of time has elapsed following the end of the execution; and
        within the specific time period, increase the EGR quantity so as to be larger than a normative gas quantity when a storage water quantity of the condensed water stored in the condensed water tank is smaller than a normative water quantity, the normative gas quantity being the EGR quantity calculated by the EGR quantity calculating device.

2. The condensed water treatment device according to claim 1, wherein
    the EGR quantity increasing device is configured to increase the EGR quantity so as to be larger than the normative gas quantity when the storage water quantity of the condensed water stored in the condensed water tank is smaller than the normative water quantity outside the specific time period, and
    an amount by which the EGR quantity increased within the specific time period by the EGR quantity increasing device is larger than an amount by which the EGR quantity increased outside the specific time period by the EGR quantity increasing device.

3. The condensed water treatment device according to claim 2, wherein
    the normative water quantity to be used within the specific time period is set so as to be larger than the normative water quantity to be used outside the specific time period.

4. The condensed water treatment device according to claim 1, wherein the increase quantity of the EGR quantity increased by the EGR quantity increasing device is calculated based on an accumulation quantity of the PM captured by the filter.

\* \* \* \* \*